United States Patent
Nagatani et al.

(10) Patent No.: US 9,105,368 B2
(45) Date of Patent: Aug. 11, 2015

(54) INFRARED RADIATION ELEMENT

(71) Applicant: PANASONIC INTELLECTUAL PROPERTY MANAGEMENT CO., LTD., Osaka (JP)

(72) Inventors: Yoshiharu Nagatani, Osaka (JP); Yoshifumi Watabe, Osaka (JP); Koji Tsuji, Osaka (JP); Masao Kirihara, Osaka (JP); Takaaki Yoshihara, Osaka (JP); Hirotaka Matsunami, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/398,205

(22) PCT Filed: Mar. 12, 2013

(86) PCT No.: PCT/JP2013/001598
§ 371 (c)(1),
(2) Date: Oct. 31, 2014

(87) PCT Pub. No.: WO2013/168332
PCT Pub. Date: Nov. 14, 2013

(65) Prior Publication Data
US 2015/0123016 A1 May 7, 2015

(30) Foreign Application Priority Data

May 9, 2012 (JP) ................................. 2012-107807

(51) Int. Cl.
| | | |
|---|---|---|
| *G01J 5/14* | (2006.01) | |
| *G01J 5/02* | (2006.01) | |
| *G01J 5/00* | (2006.01) | |
| *G21K 5/02* | (2006.01) | |

(52) U.S. Cl.
CPC ........................ *G21K 5/02* (2013.01)

(58) Field of Classification Search
USPC ........ 250/336.1, 338.1, 338.3, 338.4, 339.01, 250/339.06, 340, 341.1, 341.5, 493.1, 250/495.1, 504 R, 526; 313/15, 43, 45, 259, 313/325, 506; 219/119, 260, 395, 397, 411, 219/417, 427, 443.1, 478, 538, 539, 542, 219/544; 392/407, 467

See application file for complete search history.

(56) References Cited

U.S. PATENT DOCUMENTS

| | | | | |
|---|---|---|---|---|
| 5,827,438 | A * | 10/1998 | Blomberg et al. ............ | 219/544 |
| 7,462,397 | B2 * | 12/2008 | Lingle et al. .................. | 428/426 |

(Continued)

FOREIGN PATENT DOCUMENTS

| | | |
|---|---|---|
| EP | 0869341 | 10/1998 |
| JP | 09-184757 | 7/1997 |

(Continued)

OTHER PUBLICATIONS

Search report from PCT/JP2013/001598, mail date is May 7, 2013.

(Continued)

*Primary Examiner* — Bernard E Souw
(74) *Attorney, Agent, or Firm* — Greenblum & Bernstein P.L.C.

(57) ABSTRACT

An infrared radiation element includes: a first insulating layer having heat insulating properties and electrically insulating properties; a heating element layer provided on the first insulating layer and configured to radiate infrared radiation when energized; and a second insulating layer provided on an opposite side of the heating element layer from the first insulating layer and having heat insulating properties and electrically insulating properties. The second insulating layer transmits the infrared radiation radiated from the heating element layer. The heating element layer has such a sheet resistance that impedance of the heating element layer matches impedance of space which is in contact with the second insulating layer.

11 Claims, 8 Drawing Sheets

(56) References Cited

U.S. PATENT DOCUMENTS

| | | | |
|---|---|---|---|
| 2004/0140428 A1* | 7/2004 | Ionescu et al. | 250/338.1 |
| 2006/0060788 A1 | 3/2006 | Uchida et al. | |
| 2007/0108383 A1* | 5/2007 | Combes et al. | 250/338.1 |
| 2009/0242768 A1* | 10/2009 | Tohyama | 250/338.3 |
| 2011/0212311 A1* | 9/2011 | Lemmer et al. | 428/212 |
| 2012/0235038 A1 | 9/2012 | Nishikawa et al. | |

FOREIGN PATENT DOCUMENTS

| | | |
|---|---|---|
| JP | 2001-076685 | 3/2001 |
| JP | 2005-114534 | 4/2005 |
| JP | 2005-140594 | 6/2005 |
| JP | 2007-527508 | 9/2007 |
| JP | 2009-236865 | 10/2009 |
| JP | 2010-230453 | 10/2010 |
| JP | 2010-236934 | 10/2010 |
| JP | 2011-064633 | 3/2011 |
| JP | 2011-511404 | 4/2011 |
| JP | 2012-225829 | 11/2012 |
| WO | 2005/003704 | 1/2005 |
| WO | 2009/097896 | 8/2009 |

OTHER PUBLICATIONS

Search report from E.P.O., mail date is May 19, 2015.

* cited by examiner

INFRARED RADIATION ELEMENT

TECHNICAL FIELD

The present invention relates to infrared radiation elements.

BACKGROUND ART

Recently, infrared radiation elements manufactured by use of manufacturing techniques or the like for MEMS (micro electro mechanical systems) have been studied and developed. These kinds of infrared radiation elements may be used as infrared sources for gas sensors, optical analysis devices, or the like.

Figure 8:
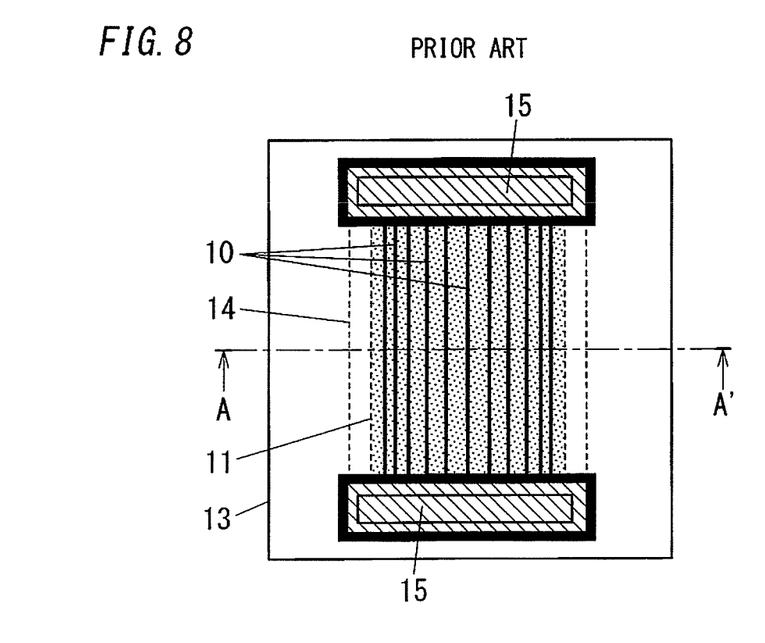
FIG. 8 is a schematic plan view of a radiation source of background arts.
Figure 9:
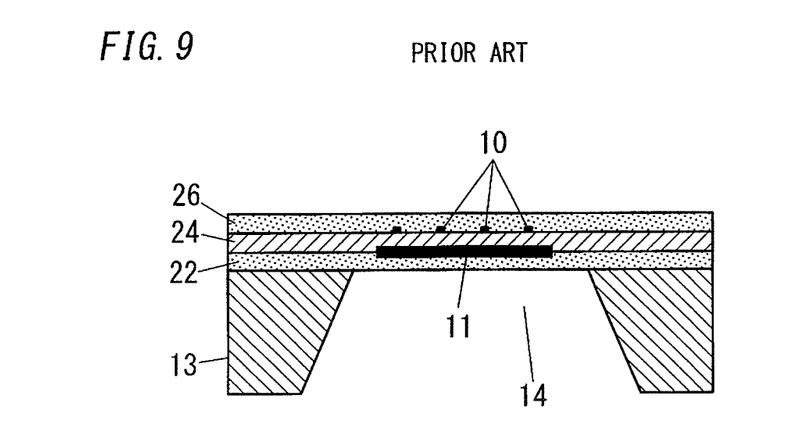
FIG. 9 is a cross-section taken along A-A line of FIG. 8.

A radiation source which has a configuration shown in FIGS. 8 and 9 and is disclosed by Patent document 1 (JP H09-184757 A) is known as one of these kinds of infrared radiation elements.

This radiation source includes: a substrate 13; a first insulating layer 22 on the substrate 13; a radiation surface layer 11 on the first insulating layer 22; a second insulating layer 24 on the radiation surface layer 11; and two or more extremely narrow incandescent filaments 10 on the second insulating layer 24. Besides, the radiation source further includes: a third insulating layer 26 to cover and protect the incandescent filaments 10; and a pair of pads 15 and 15 which are connected respectively to both ends of each incandescent filament 10 through openings of the third insulating layer 26. The second insulating layer 24 is provided for insulating the radiation surface layer 11 from the incandescent filaments 10. Patent document 1 discloses that the incandescent filaments 10 are enclosed by other components (first insulating layer 22, radiation surface layer 11, second insulating layer 24, and third insulating layer 26) which compose a uniform plane plate having a multilayer structure. Besides, Patent document 1 discloses that the purpose of providing the first insulating layer 22 and the third insulating layer 26 is to protect the incandescent filaments 10 and the radiation surface layer 11 from oxidation.

The substrate 13 has an opening 14 corresponding to the radiation surface layer 11. Patent document 1 discloses that an etchant to form the opening 14 may be an aqueous potassium hydroxide (KOH) solution, an aqueous ethylenediamine solution containing a small amount of pyrocatechol, or tetramethyl ammonium hydroxide (TMAH).

The substrate 13 is made of a (100)-oriented silicon chip. The first insulating layer 22 is a silicon nitride layer with the thickness of 200 nm. The radiation surface layer 11 is a polysilicon film which is doped with boron, phosphorus, or arsenic, and has the thickness of about 1 μm. The second insulating layer 24 is a nitride silicon layer with the thickness of about 50 nm. Each incandescent filament 10 is a tungsten layer with the thickness of about 400 nm. The third insulating layer 26 is a silicon nitride layer with the thickness of about 200 nm. The metal pad 15 is made of aluminum, for example and in ohmic contact with the incandescent filaments 10 through the opening of the third insulating layer 26.

In the radiation source, the radiation surface layer 11 has an area of 1 mm$^2$. The incandescent filaments 10 each have a size that the thickness thereof ranges from 0.1 to 1 μm, the width thereof ranges from 2 to 10 μm, and an interval therebetween ranges from 20 to 50 μm, for example.

In the radiation source, when currents flow through the incandescent filaments 10, the temperatures of the incandescent filaments 10 increase. In this regard, the incandescent filaments 10 are mainly used for heating the radiation surface layer 11, and the radiation surface layer 11 serves as a main heat radiation source.

By the way, it is known that, when an infrared radiation element is used as an infrared ray source for a spectroscopic gas sensor, for example, an S/N ratio of an output of the gas sensor is improved by intermittently driving the infrared radiation element to intermittently radiate infrared radiation and amplifying an output of a light receiving element with a lock-in amplifier.

However, when the configuration shown in FIGS. 8 and 9 is adopted for the radiation source, a response in temperature change of the radiation surface layer 11 to a voltage waveform applied to the incandescent filaments 10 is delayed due to heat capacities of the first insulating layer 22, the radiation surface layer 11, the second insulating layer 24, and the third insulating layer 26 in addition to a heat capacity of the incandescent filament 10. Therefore, in the above-mentioned radiation source, the temperature of the radiation surface layer 11 is less likely to increase, and it is difficult to lower energy consumption and increase a rate of the response.

SUMMARY OF INVENTION

The present invention has been made in view of the insufficiencies above, and an object thereof is to propose an infrared radiation element in which energy consumption can be lowered and a rate of response can be increased.

According to the first aspect of the present invention, there is provided an infrared radiation element including: a first insulating layer having heat insulating properties and electrically insulating properties; a heating element layer provided on the first insulating layer and configured to radiate infrared radiation when energized; and a second insulating layer provided on an opposite side of the heating element layer from the first insulating layer and having heat insulating properties and electrically insulating properties. The second insulating layer transmits the infrared radiation radiated from the heating element layer. The heating element layer has such a sheet resistance that impedance of the heating element layer matches impedance of space which is in contact with the second insulating layer.

According to the second aspect of the present invention referring to the first aspect, there is provided the infrared radiation element in which the sheet resistance of the heating element layer is selected so that an infrared emissivity of the heating element layer is not less than a predetermined value.

According to the third aspect of the present invention referring to the second aspect, there is provided the infrared radiation element in which the sheet resistance of the heating element layer falls within a range of 73Ω/□ to 493Ω/□.

According to the fourth aspect of the present invention referring to any one of the first to third aspects, there is provided the infrared radiation element further including a substrate. The first insulating layer is provided on a surface of the substrate.

According to the fifth aspect of the present invention referring to the fourth aspect, there is provided the infrared radiation element in which the substrate has an opening to expose the first insulating layer. According to the sixth aspect of the present invention referring to the fifth aspect, there is provided the infrared radiation element in which the heating element layer is positioned in a region in which the first insulating layer is in contact with the opening in a plan view.

According to the seventh aspect of the present invention referring to the fifth or sixth aspect, there is provided the infrared radiation element further including a pair of electrodes provided respectively on both ends of an opposite surface of the heating element layer from the first insulating layer.

According to the eighth aspect of the present invention referring to the seventh aspect, there is provided the infrared radiation element further including: a pair of pads positioned in a region in which the opening is not provided in a plan view, the pair of pads being arranged to extend parallel to a predetermined direction; and a pair of electrical connectors electrically connecting the pair of pads to the pair of electrodes, individually. The pair of electrical connectors are arranged symmetrical about a center line passing through a center of gravity of the heating element layer and extends in the predetermined direction.

According to the ninth aspect of the present invention referring to the eighth aspect, there is provided the infrared radiation element in which each of the pair of electrical connectors is composed of two or more wires.

According to the tenth aspect of the present invention referring to the eighth or ninth aspect, there is provided the infrared radiation element in which the pair of electrical connectors are made of tantalum.

According to the eleventh aspect of the present invention referring to any one of the first to tenth aspects, there is provided the infrared radiation element in which the heating element layer is made of tantalum nitride or electrically conductive polysilicon.

DESCRIPTION OF EMBODIMENTS

First Embodiment

Figure 1:
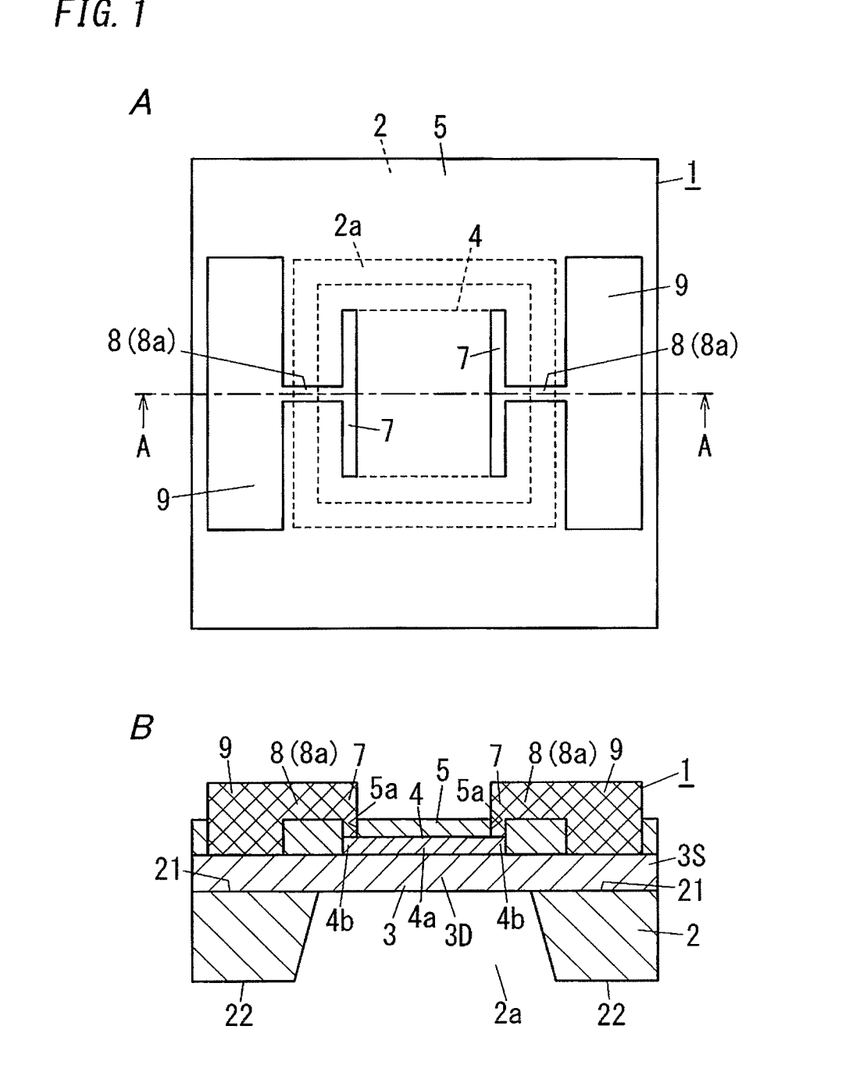
FIG. 1A is a schematic plan view of an infrared radiation element of the first embodiment.
FIG. 1B is a cross-section taken along A-A line of FIG. 1A.

An infrared radiation element 1 of the first embodiment will be described below based on FIGS. 1A and 1B.

The infrared radiation element 1 of the first embodiment includes a substrate 2, a first insulating layer 3 provided on a surface 21 of the substrate 2, and a second insulating layer 4 directly provided on the first insulating layer 3 at an opposite side of the first insulating layer 3 from the substrate 2. Besides, the infrared radiation element 1 further includes a pair of electrodes 7 and 7 which are in contact with the periphery of the heating element layer 4 at a side of the surface 21 of the substrate 2. Furthermore, the infrared radiation element 1 further includes a pair of pads 9 and 9 which are electrically connected to the electrodes 7 and 7 through electrical connectors 8 (wires 8a), respectively. The infrared radiation element 1 of the first embodiment includes a second insulating layer 5 which is provided directly on the heating element layer 4 at an opposite side of the first insulating layer 3 from the substrate 2 and is transparent to infrared radiation radiated from the heating element layer 4. The substrate 2 has an opening 2a to expose an opposite surface of the first insulating layer 3 from the heating element layer 4. In this infrared radiation element 1, the heating element layer 4 radiates infrared radiation when energized.

In other words, the infrared radiation element 1 of the first embodiment includes the first insulating layer 3, the heating element layer 4 provided on the first insulating layer 3, and the second insulating layer 5 provided on an opposite side of the heating element layer 4 from the first insulating layer 3. The heating element layer 4 produces heat and radiates infrared radiation when energized. Besides, the infrared radiation element 1 of the first embodiment includes the substrate 2, and the first insulating layer 3 is provided on the surface 21 of the substrate 2. The substrate 2 has the opening 2a to expose the first insulating layer 3.

The sheet resistance of the heating element layer 4 is selected so as to suppress a drop in infrared emissivity due to impedance mismatch between the second insulating layer 5 and the space with which the second insulating layer 5 is in contact (e.g., air, or gas such as nitrogen gas).

Each configuration element of the infrared radiation element 1 will be described below in detail.

The substrate 2 is a monocrystalline silicon substrate having a (100) plane which is to be the surface 21. However, the substrate 2 may be a monocrystalline silicon substrate having a (110) plane. The substrate 2 may not be limited to a monocrystalline silicon substrate and may be a polycrystalline silicon substrate. The substrate 2 may not be a silicon substrate. The material for the substrate 2 preferably has a greater thermal conductivity and a greater heat capacity than that for the first insulating layer 3.

The substrate 2 has an outer shape of a rectangle. In other words, the substrate 2 has a rectangular shape in a plane perpendicular to a thickness direction (perpendicular direction to the sheet of FIG. 1A; vertical direction in FIG. 1B) of the substrate 2. The outer size of the substrate 2 is not particularly limited, but is preferably not greater than a square size of 10 mm (10 mm*10 mm). Besides, the opening 2a of the substrate 2 has an opening shape of a rectangle. The opening 2a of the substrate 2 has such a shape that an area of the opening 2a is greater towards a further surface 22 than at the surface 21 (surface closer to the first insulating layer 3). The further surface 22 is an opposite surface of the substrate 2 from the surface 21. That is, the opening 2a of the substrate 2 has such a shape that a region of the opening 2a is larger with an increase in a distance of the opening 2a from the first insulating layer 3. The opening 2a of the substrate 2 is prepared by etching the substrate 2. When the substrate 2 is a monocrystalline silicon substrate having a (100) plane to be the surface 21, the opening 2a of the substrate 2 may be prepared by anisotropically etching the substrate 2 by use of an alkaline solution as an etchant. The opening shape of the opening 2a of the substrate 2 is not particularly limited. When a mask layer used for forming the opening 2a is made of an inorganic material, the infrared radiation element 1 may include a remaining mask layer on the further surface 22 of the substrate 2. The mask layer may be a laminate of a silicon oxide film and a silicon nitride film, for example.

The first insulating layer 3 has heat insulating properties and electrical insulating properties. The first insulating layer 3 is formed on the surface 21 of the substrate 2 and covers the opening 2a. The first insulating layer 3 is composed of a diaphragm part 3D and a supporting part 3S. The diaphragm part 3D partitions the opening 2a and the heating element layer 4. The supporting part 3S is provided on the surface 21 to surround the opening 2a and supports the diaphragm part 3D. In other words, the first insulating layer 3 has the diaphragm part 3D defined as a part which overlaps the opening 2a and the supporting part 3S defined as a part which does not overlap the opening 2a. The diaphragm part 3D and supporting part 3S are at a side of the surface 21 of the substrate 2. The diaphragm part 3D is formed in a diaphragm region. The diaphragm region is defined as a region where the opening 2a is formed in the surface 21 of the substrate 2 in a plan view. In other words, the diaphragm region is a region where the opening 2a contacts with the first insulating layer 3 (diaphragm part 3D). Note that the term "in a plan view" refers to a view seen in the thickness direction of the substrate 2 (and the heating element layer 4).

The infrared radiation element 1 has a diaphragm unit in the diaphragm region. In the first embodiment, the diaphragm unit is composed of the first insulating layer 3 (diaphragm part 3D), the heating element layer 4, the second insulating layer 5, the electrodes 7, and the electrical connectors 8. Besides, in the first embodiment, the periphery of the first insulating layer 3 is lined up with the periphery of the substrate 2.

The first insulating layer 3 is composed of a silicon oxide film close to the substrate 2 and a silicon nitride film on an opposite side of the silicon oxide film from the substrate 2. The first insulating layer 3 is not limited to the laminate of the silicon oxide film and the silicon nitride film, and may have a single layer structure of a silicon oxide film or a silicon nitride film, a single layer structure of another material, or a multiple layer structure of two or more layers made of other materials.

The first insulating layer 3 also serves as an etching stopper layer in forming the opening 2a by etching the further surface 22 of the substrate 2 which is opposite from the surface 21 of the substrate 2 for preparation of the infrared radiation element 1.

The heating element layer 4 is designed to produce heat to radiate infrared radiation when energized. That is, the heating element layer 4 serves as a heater as well as a light-emitting layer to radiate infrared radiation. The heating element layer 4 has a planar shape of a rectangle. In this regard, the planar shape of the heating element layer 4 is defined as a shape of the heating element layer 4 in a plane perpendicular to the thickness direction of the heating element layer 4. The heating element layer 4 of the first embodiment is formed in a region (diaphragm region) in which the first insulating layer 3 (diaphragm part 3D) and the heating element layer 4 contact with each other in a plan view. In other words, the heating element layer 4 is positioned on a region (diaphragm region) in which the opening 2a is formed in the surface 21 of the substrate 2 in the plan view. That is, the heating element layer 4 is positioned within a region of the opening 2a in a plane parallel with the surface 21 of the substrate 2. The planar size of the heating element layer 4 is preferably smaller than a planar size of a surface in contact with the opening 2a of the first insulating layer 3. That is, the planar size of the heating element layer 4 is preferably smaller than the planar size of the diaphragm part 3D (namely, size of the opening 2a at the surface 21). In this regard, the planar size of the diaphragm part 3D is not particularly limited but is preferably not more than a square size of 5 mm (not larger than 5 mm*5 mm).

The infrared radiation element 1 of the first embodiment has the electrodes 7, and the electrodes 7 are in contact with the heating element layer 4. The heating element layer 4 has a region to be in contact with the electrodes 7, and the region is referred to as a contact region 4b. In the heating element layer 4, a region other than the contact region 4b is referred to as a radiation region 4a. In brief, the heating element layer 4 has the contact region 4b and the radiation region 4a. In the first embodiment, the heating element layer 4 has a pair of the contact regions 4b which are opposite from each other. In the first embodiment, the contact regions 4b are on respective edges of an opposite surface (upper surface in FIG. 1B) of the heating element layer 4 from the first insulating layer 3. The pair of contact regions 4b respectively on edges of the heating element layer 4 extend along a width direction of the heating element layer 4 (vertical direction in FIG. 1A; perpendicular direction to the sheet of FIG. 1B). The planar size of the heating element layer 4 is preferably selected so that the planar size of the radiation region 4a, which is not the contact regions 4b in which the electrode 7 overlaps with the heating element layer 4, is not larger than a square size of 3 mm (3 mm*3 mm).

The heating element layer 4 is made of tantalum nitride. That is, the heating element layer 4 is a tantalum nitride layer made of tantalum nitride. The material for the heating element layer 4 is not limited to tantalum nitride, but may be titanium nitride, nickel chromium, tungsten, titanium, thorium, platinum, zirconium, chromium, vanadium, rhodium, hafnium, ruthenium, boron, iridium, niobium, molybdenum, tantalum, osmium, rhenium, nickel, holmium, cobalt, erbium, yttrium, iron, scandium, thulium, palladium, or lutetium, for example. Besides, the material for the heating element layer 4 may be electrically conductive polysilicon. That is, the heating element layer 4 may be an electrically conductive polysilicon layer which has electrical conductive properties and is made of polysilicon. The heating element layer 4 is preferably the tantalum nitride layer or the electrically conductive polysilicon layer in view of chemical stability at high temperature and design-ability of sheet resistance. When the heating element layer 4 is the tantalum nitride layer, the sheet resistance of the heating element layer 4 can be changed by changing the composition of the tantalum nitride layer (e.g., molar ratio of Ta and N). When the heating element layer 4 is the electrically conductive polysilicon layer, the sheet resistance of the heating element layer 4 can be changed by changing a contaminant concentration of the electrically conductive polysilicon layer. The electrically conductive polysilicon layer may be an n-type polysilicon layer doped with n-type impurities at a high concentration. Alternatively, the electrically conductive polysilicon layer may be a p-type polysilicon layer doped with p-type impurities at a high concentration. When the heating element layer 4 is the electrically conductive polysilicon layer (n-type polysilicon layer) and phosphorus is used as the n-type impurity, for example, the impurity concentration may be appropriately selected in a range of about $1*10^{18}$ cm$^{-3}$ to about $5*10^{20}$ cm$^{-3}$. When the heating element layer 4 is the electrically conductive polysilicon layer (p-type polysilicon layer) and boron is used as the p-type impurity, for example, the impurity concentration may be appropriately selected in a range of about $1*10^{18}$ cm$^{-3}$ to about $1*10^{20}$ cm$^{-3}$. Note that the material for the heating element layer 4 preferably has such a linear expansion coefficient that a difference in linear expansion coefficient between the materials of the heating element layer 4 and the substrate 2 is smaller in view of preventing the heating element layer 4 from breaking up due to thermal stress caused by the difference in linear expansion coefficient.

In the infrared radiation element 1, a peak wavelength λ of the infrared radiation radiated from the heating element layer 4 varies depending on the temperature of the heating element layer 4. In this regard, provided that T [K] represents the absolute temperature of the heating element layer 4, and λ [μm] represents the peak wavelength, the peak wavelength λ satisfy the equations of:

$$\lambda = 2898/T.$$

The relation between the absolute temperature T of the heating element layer 4 and the peak wavelength λ of the infrared radiation meet the Wien's displacement law. In the infrared radiation element 1, joule heat produced in the heating element layer 4 can be changed by adjusting input power applied between the pair of pads 9 and 9 from an external power (not shown), and thereby the temperature of the heating element layer 4 can be changed. In short, the temperature of the heating element layer 4 varies depending on the power applied to the heating element layer 4. Therefore, in the infrared radiation element 1, the temperature of the heating element layer 4 can be changed by selecting the input power to the heating element layer 4, and the peak wavelength λ of the infrared radiation radiated from the heating element layer 4 can be changed by changing the temperature of the heating element layer 4. Besides, in the infrared radiation element 1 of the first embodiment, it is possible to increase a radiation amount of the infrared radiation with an increase in the temperature of the heating element layer 4. Therefore, it is possible to use the infrared radiation element 1 as a high output infrared source to radiate infrared radiation in a wide range of the infrared wavelength region. For example, when the infrared radiation element 1 is used as an infrared light source of a gas sensor, arbitrarily selecting frequency of an infrared radiation to be transmitted by an optical filter of a detector to receive the infrared radiation enables selection of gas to be detected by the gas sensor. Particularly, when the optical filter is designed to transmit two or more kinds of infrared radiation with different wavelength, the gas sensor can detect two or more kinds of gas.

The second insulating layer 5 has heat insulating properties and electrically insulating properties. The second insulating layer 5 of the first embodiment is configured to transmit the infrared radiation radiated from the heating element layer 4. A part of the opposite surface of the second insulating layer 5 of the first embodiment from the heating element layer 4 is covered by the wires 8a, and the other part is exposed and is in contact with the space. The second insulating layer 5 is a silicon nitride film. The second insulating layer 5 is not limited to this, and may be a silicon oxide film or a laminate of the silicon oxide film and the silicon nitride film, for example. The second insulating layer 5 preferably has high transmissivity regarding the infrared radiation which has a desired wavelength or is in a desired wavelength region and is radiated from the heating element layer 4 when the heating element layer 4 is energized. The transmissivity is not necessarily 100%.

The second insulating layer 5 of the first embodiment covers the heating element layer 4, and the heating element layer 4 is provided between the second insulating layer 5 and the first insulating layer 3. The second insulating layer 5 has a pair of contact holes 5a for providing a contact of the electrodes 7 with the heating element layer 4. The contact holes 5a penetrate the second insulating layer 5, and the electrode 7 extends through the contact hole 5a and is on the heating element layer 4. Therefore, the electrode 7 can be in contact with the heating element layer 4. Accordingly, the heating element layer 4 can be energized through the electrodes 7.

In the infrared radiation element 1, materials and thicknesses of the first insulating layer 3 and the second insulating layer 5 are preferably selected in view of stress balance on a sandwiched structure (a structure in which the heating element layer 4 is interposed between the first insulating layer 3 and the second insulating layer 5) composed of the first insulating layer 3, the heating element layer 4, and the second insulating layer 5. Accordingly, in the infrared radiation element 1, it is possible to improve the stress balance on the above-mentioned sandwiched structure, and thus to more suppress warpage or break of the sandwiched structure. Hence, it is possible to further improve mechanical strength.

The above-mentioned thickness (length in the perpendicular direction to the sheet of FIG. 1A; length in the vertical direction in FIG. 1B) of the heating element layer 4 is preferably not more than 0.2 μm in view of reducing the heat capacity of the heating element layer 4.

The total thickness of the first insulating layer 3, the heating element layer 4, and the second insulating layer 5 preferably falls within a range of about 0.1 μm to about 1 μm, and is more preferably not more than 0.7 μm for the purpose of reducing a heat capacity of a laminated unit of the first insulating layer 3, the heating element layer 4, and the second insulating layer 5.

The pair of electrodes 7 and 7 are in contact with a periphery (both of left and right edges in FIG. 1A, respectively) of an opposite surface of the heating element layer 4 from the substrate 2 at a surface 21 side of the substrate 2. That is, the infrared radiation element 1 has the pair of electrodes 7 and 7 formed on the both edges of the heating element layer 4 at the opposite side of the heating element layer 4 from the first insulating layer 3. In the first embodiment, the pair of electrodes 7 and 7 extend along the width direction of the heating element layer 4 (vertical direction in FIG. 1A; perpendicular direction to the sheet of FIG. 1B), and are arranged in a length direction of the heating element layer 4 (lateral direction in FIGS. 1A and 1B). Each electrode 7 extends through the contact hole 5a of the second insulating layer 5, and is on the heating element layer 4 to be in electrical contact with the heating element layer 4. In this regard, each electrode 7 is in ohmic contact with the heating element layer 4.

In the first embodiment, the material for each electrode 7 is an aluminum alloy (Al—Si). That is, the electrode 7 is preferably made of the aluminum alloy (Al—Si). Alternatively, the electrode 7 is preferably made of Al or Al—Cu. However, the material for each electrode 7 is not particularly limited thereto, and may be gold or cupper, for example. Each electrode 7 has a part in contact with the heating element layer 4, and it is sufficient that the part is made of such a material which allows an ohmic contact with the heating element layer 4. Therefore, the electrode 7 is not limited to having a monolayer structure but may have a multilayer structure. For example, each electrode 7 has a three-layer structure in which a first layer, a second layer, and a third layer are stacked and arranged from the heating element layer 4 in this order, and the first layer in contact with the heating element layer 4 may be made of high melting point metal (e.g., chromium), and the second layer may be made of nickel, and the third layer may be made of gold.

The pad 9 is formed on the supporting part 3S. That is, the pad 9 is formed on a region in which the opening 2a is not formed in a plan view. In other words, the pad 9 is positioned outside the opening 2a in a plane parallel to the surface 21 of the substrate 2. Then, the pair of pads 9 are arranged to extend parallel to each other in the region in which the opening 2a is not formed in a plan view. In brief, the pair of pads 9 are arranged to extend parallel to a predetermined direction. In the first embodiment, the pair of pads 9 are arranged to extend parallel to each other so that a region in which the opening 2a is formed is in-between.

The pair of electrical connectors 8 and 8 electrically connect the pair of pads 9 and 9 to the pair of electrodes 7 and 7, individually. In the first embodiment, the electrical connector 8 is constituted by one wire 8a. It is preferable that each electrical connector 8 (wire 8a) and each pad 9 are made of the same material and have the same layer structure and same thickness as those of each electrode 7. Accordingly, in the infrared radiation element 1, each electrical connector 8 (each wire 8a) and each pad 9 can be formed in parallel with each electrode 7. The thickness of the pad 9 preferably falls within a range of about 0.5 to about 2 μm.

To prepare the infrared radiation element 1, the first insulating layer 3, the heating element layer 4, and the second insulating layer 5 are formed on the surface 21 of the substrate 2 in this order, and then the contact holes 5a are formed in the second insulating layer 5. Thereafter, each electrode 7, each electrical connector 8 (wire 8a), and each pad 9 are formed, and subsequently the opening 2a may be formed in the substrate 2.

A method of preparing the silicon oxide film of the first insulating layer 3 may adopt thin-film formation techniques such as the heat oxidation method and the CVD (chemical Vapor Deposition), and preferably is the heat oxidation method. A method of preparing the silicon nitride film of the first insulating layer 3 may adopt thin-film formation techniques such as the CVD, and is preferably the LPCVD (Low Pressure Chemical Vapor Deposition).

The method of preparing the heating element layer 4 may adopt thin-film formation techniques such as sputtering, depositing, and the CVD, and/or processing techniques using photolithography techniques and etching techniques, for example.

The method of preparing the second insulating layer 5 may adopt thin-film formation techniques such as the CVD, and/or processing techniques using photolithography techniques and etching techniques, for example. The CVD for preparing the second insulating layer 5 is preferably the plasma CVD.

To form the contact holes 5a, photolithography techniques and etching techniques may be adopted.

To form each electrode 7, each wire 8a, and each pad 9, the thin-film formation techniques such as sputtering, depositing, and the CVD, and/or processing techniques using photolithography techniques and etching techniques may be used, for example. Besides, to form the opening 2a, the laminate (not shown) of the silicon oxide film and the silicon nitride film may be formed as the mask layer on the further surface 22 of the substrate 2 which is the opposite surface from the surface 21 of the substrate 2. Thereafter, the further surface 22 of the substrate 2 may be etched to form the opening 2a. The mask layer is prepared by forming the silicon oxide film which serves as a basis of the mask layer on the further surface 22 of the substrate 2 in parallel with the formation of the silicon oxide film which composes the first insulating layer 3, and thereafter forming the silicon nitride film over the further surface 22 of the substrate 2 in parallel with formation of the silicon nitride film which composes the first insulating layer 3. Patterning of the laminate of the silicon oxide film and the silicon nitride film which serves as the basis of the mask layer may be performed by the photolithography techniques and etching techniques.

The method of preparing the infrared radiation element 1 in the first embodiment adopts the first insulating layer 3 as the etching stopper layer for forming the opening 2a. Therefore, it is possible to improve accuracy in thickness of the first insulating layer 3, and to prevent that a part or residue of the substrate 2 remains at an opening 2a side of the first insulating layer 3. According to this method, it is possible to reduce differences in mechanical strength of the first insulating layer 3 and in heat capacity of the entire diaphragm part 3D of the first insulating layer 3 between infrared radiation elements 1.

To prepare a plurality of the above-mentioned infrared radiation elements 1 at once, a process until completion of formation of the opening 2a is conducted at a wafer level, and thereafter the infrared radiation elements 1 may be separated into individual ones after formation of the opening 2a. In other words, to prepare the plurality of infrared radiation elements 1, a silicon wafer to be a basis of a plurality of substrates 2 is prepared, and the plurality of the infrared radiation elements 1 are formed using this silicon wafer and thereafter separated into individual infrared radiation elements 1.

As apparent from the above-mentioned method of preparing the infrared radiation element 1, the infrared radiation element 1 may be prepared using manufacturing techniques of MEMS.

The sheet resistance of the heating element layer 4 is selected so as to suppress a drop in infrared emissivity due to impedance mismatch between the second insulating layer 5 and the space with which the second insulating layer 5 is in contact (e.g., air, or gas such as nitrogen gas). In brief, the heating element layer 4 has such a sheet resistance that impedance of the heating element layer 4 matches impedance of space which is in contact with the second insulating layer 5.

For example, when the heating element layer 4 is made of tantalum nitride, the sheet resistance of the heating element layer 4 can be controlled with a partial pressure of nitrogen gas in forming a tantalum nitride layer which is a basis of the heating element layer 4 by reactive sputtering. In short, when the heating element layer 4 is made of tantalum nitride, the sheet resistance of the heating element layer 4 can be changed by changing a composition (ratio of Ta to N) of the tantalum nitride layer. Alternatively, when the heating element layer 4 is made of the electrically conductive polysilicon, the sheet resistance of the heating element layer 4 can be changed by changing an impurity concentration of the electrically conductive polysilicon layer which is the basis of the heating element layer 4. As a method of controlling the impurity concentration of the electrically conductive polysilicon layer, there are a method of preparing a non-doped polysilicon layer and thereafter doping the non-doped polysilicon layer with impurities, and another method of forming materials which has been doped with impurities into a film.

In the infrared radiation element 1 of the first embodiment, when the above-mentioned space (gas) is filled with air, and the heating element layer 4 is made of tantalum nitride, and the heating element layer 4 is heated to an intended operating temperature of 500° C., for example, the sheet resistance of the heating element layer 4 to provide a maximum infrared emissivity of the heating element layer 4 at the operating temperature is 189Ω/□ (189Ω/sq.), and the maximum value of the emissivity is 50%. In other words, when the sheet resistance of the heating element layer 4 is 189Ω/□, it is possible to maximize the infrared emissivity owing to impedance matching with air. Therefore, in order to ensure the emissivity of 40% or more by suppressing the drop in emissivity, for example, the sheet resistance of the heating element layer 4 may be selected within a range of 73 to 493Ω/□. In this regard, provided that the sheet resistance to provide a maximum emissivity at an intended operating temperature is referred to as a predetermined sheet resistance, the sheet resistance of the heating element layer 4 at the intended operating temperature is preferably selected to be the predetermined sheet resistance, give or take 10% thereof. In other words, in the infrared radiation element 1, the sheet resistance of the heating element layer 4 is preferably selected so that the infrared emissivity is not less than a predetermined value. Specifically, the sheet resistance of the heating element layer 4 is preferably selected in a range of $73\Omega/\square$ to $493\Omega/\square$.

The infrared radiation element 1 includes the substrate 2, the first insulating layer 3, the heating element layer 4, the second insulating layer 5, and the pair of electrodes 7 and 7. The heating element layer 4 radiates infrared radiation when the heating element layer 4 is energized. The substrate 2 has the opening 2a to expose the opposite surface of the first insulating layer 3 from the heating element layer 4. The sheet resistance of the heating element layer 4 is selected so as to suppress a drop in infrared emissivity due to impedance mismatch between the second insulating layer 5 and the space (gas) with which the second insulating layer 5 is in contact.

As described above, the infrared radiation element 1 of the first embodiment includes the following first to seventh, and eleventh features. Note that, the eighth to tenth features will be described below.

In the first feature, the infrared radiation element 1 includes: the first insulating layer 3 having heat insulating properties and electrically insulating properties; the heating element layer 4 provided on the first insulating layer 3 and configured to radiate infrared radiation when energized; and the second insulating layer 5 provided on an opposite side of the heating element layer 4 from the first insulating layer 3 and having heat insulating properties and electrically insulating properties. The second insulating layer 5 transmits the infrared radiation radiated from the heating element layer 4. The heating element layer 4 has such a sheet resistance that impedance of the heating element layer 4 matches impedance of the space which is in contact with the second insulating layer 5.

In the second feature, in the infrared radiation element 1 including the first feature, the sheet resistance of the heating element layer 4 is selected so that an infrared emissivity of the heating element layer 4 is not less than a predetermined value. Note that in the infrared radiation element 1 of the present embodiment, the second feature is optional.

In the third feature, in the infrared radiation element 1 including the second feature, the sheet resistance of the heating element layer 4 falls within a range of $73\Omega/\square$ to $493\Omega/\square$. Note that in the infrared radiation element 1 of the present embodiment, the third feature is optional.

In the fourth feature, the infrared radiation element 1 including any one of the first to third features includes the substrate 2. The first insulating layer 3 is provided on the surface 21 of the substrate 2. Note that in the infrared radiation element 1 of the present embodiment, the fourth feature is optional.

In the fifth feature, in the infrared radiation element 1 including the fourth feature, the substrate 2 has the opening 2a to expose the first insulating layer 3. Note that in the infrared radiation element 1 of the present embodiment, the fifth feature is optional.

In the sixth feature, in the infrared radiation element 1 including the fifth feature, the heating element layer 4 is positioned in a region in which the first insulating layer 3 is in contact with the opening 2a in a plan view. Note that in the infrared radiation element 1 of the present embodiment, the sixth feature is optional.

In the seventh feature, the infrared radiation element 1 including the fifth or sixth feature includes the pair of electrodes 7 and 7 provided respectively on both ends of an opposite surface of the heating element layer 4 from the first insulating layer 3. Note that in the infrared radiation element 1 of the present embodiment, the seventh feature is optional.

In other words, the infrared radiation element 1 including the first, fourth, fifth, and seventh features includes: the substrate 2; the first insulating layer 3 provided on the surface 21 of the substrate 2; the heating element layer 4 provided directly on the opposite side of the first insulating layer 3 from the substrate 2; the pair of electrodes 7 and 7 which are in contact with the periphery of the heating element layer 4 at a side of the surface 21 of the substrate 2; and the second insulating layer 5 which is provided directly on the heating element layer 4 at the opposite side of the first insulating layer 3 from the substrate 2 and is transparent to the infrared radiation radiated from the heating element layer 4. The substrate 2 has the opening 2a to expose the opposite surface of the first insulating layer 3 from the heating element layer 4. The sheet resistance of the heating element layer 4 is selected so as to suppress a drop in infrared emissivity due to impedance mismatch between the second insulating layer 5 and the gas with which the second insulating layer 5 is in contact.

In the eleventh feature, in the infrared radiation element 1 including any one of the first to tenth features, the heating element layer 4 is the tantalum nitride layer or the electrically conductive polysilicon layer. Note that in the infrared radiation element 1 of the present embodiment, the eleventh feature is optional.

In other words, in the eleventh feature, the heating element layer 4 is made of tantalum nitride or electrically conductive polysilicon.

In this regard, the output regarding the infrared radiation of the infrared radiation element is almost in proportion to the infrared emissivity of the layer which radiates infrared radiation (the heating element layer 4, in the first embodiment). In this regard, it is generally known that the infrared emissivity is almost in proportion to the fourth power of a temperature of an object (heating element layer 4, in the first embodiment) which radiates infrared radiation. Note that, the temperature of the heating element layer 4 is in proportion to heat (power) applied to the heating element layer 4 and is in inverse proportion to heat capacities of the heating element layer 4, the first insulating layer 3, and the second insulating layer 5. A heat capacity of a layer is in proportion to a thickness of a layer per unit area.

In the conventional infrared radiation element, as described in Patent document 1, for example, to improve the output regarding the infrared radiation, a way of increasing the volume of the layer (radiation surface layer) to radiate infrared radiation is adopted, and the radiation surface layer is thickened (in Patent document 1, the thickness of the radiation surface layer is about 1 µm). However, in the infrared radiation element, a thicker radiation surface layer has a greater heat capacity, and therefore, the output regarding the infrared radiation may be actually smaller, compared with an infrared radiation element including a thinner radiation surface layer. The thicker radiation surface layer requires greater power to be heated to a temperature than the thinner radiation surface layer (in an assumption that the thicker radiation surface layer and the thinner radiation surface layer are the same except for their thicknesses). Therefore, even when the same power is applied to the thicker radiation surface layer and the thinner radiation surface layer, an increase in temperature of the thicker radiation surface layer is smaller than that of the thinner radiation surface layer. Therefore, there is concern that the infrared emissivity of the thicker radiation surface layer is smaller than that of the thinner radiation surface layer.

Besides, to provide high output infrared radiation, the infrared radiation element having the thicker radiation surface layer requires greater power. Accordingly, regarding the infrared radiation element having the thicker radiation surface layer, it is difficult to lower energy consumption.

In contrast, in the infrared radiation element 1 of the first embodiment, to improve an infrared radiation output, impedance of the heating element layer 4 is designed to match impedance of the space which is in contact with the second insulating layer 5. Therefore, in the infrared radiation element 1, even when the layer to radiate infrared radiation (heating element layer 4) is thinner (e.g., 0.2 µm) than that of the conventional infrared radiation element, the heating element layer 4 has relatively greater infrared emissivity (about 50%). In other words, in the infrared radiation element 1 of the first embodiment, the impedance of the heating element layer 4 is made match the impedance of the space which is in contact with the second insulating layer 5, and therefore it is possible to improve infrared emissivity and output of the infrared radiation element 1 without increasing the heat capacity of the heating element layer 4 (namely, without thickening the heating element layer 4).

It is generally known that a thermal time constant of an object is in proportion to a heat capacity of the object. Therefore, in the conventional infrared radiation element in which the layer to radiate infrared radiation (radiation surface layer) is thickened, the thermal time constant as well as the heat capacity of the infrared radiation layer are increased. Accordingly, regarding the conventional infrared radiation element, it is difficult to increase a rate of response.

In contrast, in the first embodiment, it is possible to provide the high output infrared radiation element 1 without increasing the heat capacity of the heating element layer 4. Accordingly, it is possible to decrease the thermal time constant of the heating element layer 4 of the high output infrared radiation element 1. Therefore, it is possible to increase the output of the infrared radiation element 1 and the rate of response of the infrared radiation element 1.

Hence, the infrared radiation element 1 of the first embodiment can realize both of lowered energy consumption and an increased rate of response. In other word, in the infrared radiation element 1 of the first embodiment, it is possible to lower energy consumption and increase the rate of response.

In summary, in the infrared radiation element 1, it is possible to decrease the heat capacity of the laminated unit (herein, composed of the first insulating layer 3, the heating element layer 4, and the second insulating layer 5) on the surface 21 of the substrate 2, and to suppress a drop in emissivity of the heating element layer 4. Accordingly, in the infrared radiation element 1 of the first embodiment, it is possible to lower energy consumption and the rate of response. In this regard, in the infrared radiation element 1, the heat capacity of the laminated unit on the surface 21 of the substrate 2 is reduced, and therefore it is possible to increase the rate of response in temperature change of the heating element layer 4 to a voltage waveform applied between the pair of pads 9 and 9. Accordingly, increasing temperature of the heating element layer 4 is facilitated, and thus it is possible to improve the output and the rate of response.

In the infrared radiation element 1, the substrate 2 is made of a monocrystalline silicon substrate, and the first insulating layer 3 is composed of the silicon oxide film and silicon nitride film. Accordingly, in the infrared radiation element 1, the heat capacity and heat conductivity of the substrate 2 are greater than those of the first insulating layer 3, respectively, and therefore the substrate 2 serves as a heat sink. Therefore, it is possible to downsize the infrared radiation element 1 and improve the rate of response to inputted power and stability regarding radiation characteristics of the infrared radiation.

In the infrared radiation element 1, the heating element layer 4 is made of tantalum nitride which has a higher melting point than that of silicon. Therefore, when further members other than the heating element layer 4 to compose the diaphragm unit (the first insulating layer 3, the second insulating layer 5, the electrodes 7, and the electrical connectors 8, in the first embodiment) each have a higher melting point than that of the heating element layer 4, it is possible to increase the temperature of the heating element layer 4 to the maximum operating temperature of silicon to form the substrate 2 (slightly lower temperature than the melting point of silicon). Accordingly, it is possible to greatly increase a radiation amount of the infrared radiation, compared with an infrared-emitting diode. Besides, in the infrared radiation element 1, when at least the part of each electrode 7 in contact with the heating element layer 4 is made of metal having a higher melting point than that of silicon, it is possible to increase the temperature of the heating element layer 4 irrespective of the material for the electrode 7.

In short, when the further members other than the heating element layer 4 to compose the diaphragm unit are made of materials having higher melting points than that of the heating element layer 4, it is possible to increase the temperature of the heating element layer 4 to a temperature slightly lower than the melting point of the heating element layer 4. Note that, the temperature of the heating element layer 4 refers to a temperature of a part around a center (around center of gravity) of the heating element layer 4.

When the heating element layer 4 is made of a high melting point material (material having a high melting point) such as tantalum nitride, the further members (the first insulating layer 3, the second insulating layer 5, the electrode 7, and the electrical connector 8) to compose the diaphragm unit may be made of following high melting point materials.

The high melting point material for the first insulating layer 3 and the second insulating layer 5 may be an insulator having a high melting point (e.g., silicon dioxide and silicon nitride), for example.

The high melting point material for the electrode 7 and the electrical connector 8 (wire 8a) may be selected from: metal having a high melting point (e.g., tantalum, tungsten, and molybdenum); noble metal having a high melting point (e.g., platinum, ruthenium, and iridium); and an electrically conductive material having a high melting point (electrically conductive monocrystalline silicon, electrically conductive polysilicon, electrically conductive monocrystalline germanium, electrically conductive polygermanium, and electrically conductive carbon). Note that in the first embodiment, the electrical connector 8 is made of tantalum (Ta).

When the electrical connector 8 is made of the above-described noble metal having high melting point, it is possible to suppress a change in electrical resistance of the electrical connector 8 due to oxidation in elevating a temperature of the heating element layer 4 even in a case where the electrical connector 8 is exposed.

It is sufficient that the high melting point material has a melting point higher than that of the material for the substrate 2. For example, when the substrate 2 is made of silicon, the high melting point material is selected from materials having a higher melting point than that of silicon.

When the further members (e.g., electrical connector 8) other than the heating element layer 4 to compose the diaphragm unit has a lower melting point than that of the heating element layer 4, the temperature of the heating element layer 4 (temperature of the part around the center of the heating element layer 4) may be increased to a temperature slightly lower than a melting point of a member having the lowest melting point of those of the members to compose the diaphragm unit. In this regard, part of the heating element layer 4 which is closer to the periphery thereof is likely to release more amount of heat. Besides, part of the heating element layer 4 which is closer to the substrate 2 is likely to release more amount of heat. Accordingly, the temperature of the periphery of the heating element layer 4 is lower than the temperature of the part around the center of the heating element layer 4. Moreover, the electrical connector 8 in contact with the periphery of the heating element layer 4 has substantially the same temperature as that of the periphery of the heating element layer 4 at the part in contact with the heating element layer 4 and the vicinity thereof. However, as described above, the temperature of the periphery of the heating element layer 4 is lower than the temperature of the part around the center of the heating element layer 4 to some degree. Therefore, when the temperature of the part around the center of the heating element layer 4 is set to the temperature slightly lower than the melting point of the member having the lowest melting point of those of the members to compose the diaphragm unit, the infrared radiation element 1 can be used stably. As described above, the infrared radiation element 1 of the first embodiment includes the following tenth feature in addition to the first to seventh, and eleventh features.

In the tenth feature, the electrical connector 8 is made of tantalum. Note that, in the infrared radiation element 1 of the first embodiment, the tenth feature is optional.

In the infrared radiation element 1, the heating element layer 4, the electrodes 7, the wires 8a, and the pads 9 are preferably arranged symmetrical about the center line of the infrared radiation element 1 which is perpendicular to a direction in which the pair of electrodes 7 and 7 are arranged in a plan view (seen along the thickness direction (perpendicular direction to the sheet of FIG. 1A; vertical direction in FIG. 1B)). That is, a structure at a side of the heating element layer 4 in the infrared radiation element 1 is symmetrical about an imaginary line in a length direction (vertical direction in FIG. 1A; perpendicular direction to the sheet of FIG. 1B) of the infrared radiation element 1 passing through the center of the infrared radiation element 1 in a plan view. In short, the pair of electrical connectors 8 are arranged symmetrical about the center line. The center line passes through a center of gravity of the heating element layer 4 and extends in the predetermined direction. The pair of pads 9 are arranged to extend parallel to the predetermined direction. Accordingly, it is possible to further improve mechanical strength of the infrared radiation element 1 and suppress an in-plane variation in temperature of the heating element layer 4. In the present embodiment, the heating element layer 4 and the electrodes 7 in addition to the pair of electrical connectors 8 are arranged symmetrical about the center line. In other words, the structure of the infrared radiation element 1 is 2-fold symmetric about the imaginary line which serves as a rotation axis and extends in the thickness direction of the infrared radiation element 1 and passes through the face center of the face of the heating element layer 4.

As described above, the infrared radiation element 1 of the first embodiment includes the eighth feature in addition to the first to seventh, tenth, and eleventh features. In the eighth feature, the infrared radiation element 1 includes: the pair of pads 9 positioned in a region in which the opening 2a is not provided in a plan view; and the pair of electrical connectors 8 electrically connecting the pair of pads 9 to the pair of electrodes 7, individually. The pair of pads 9 are arranged to extend parallel to the predetermined direction. The pair of electrical connectors 8 are arranged symmetrical about the center line passing through the center of gravity of the heating element layer 4 and extending in the predetermined direction. Note that in the infrared radiation element 1 of the first embodiment, the eighth feature is optional.

Second Embodiment

Figure 2:
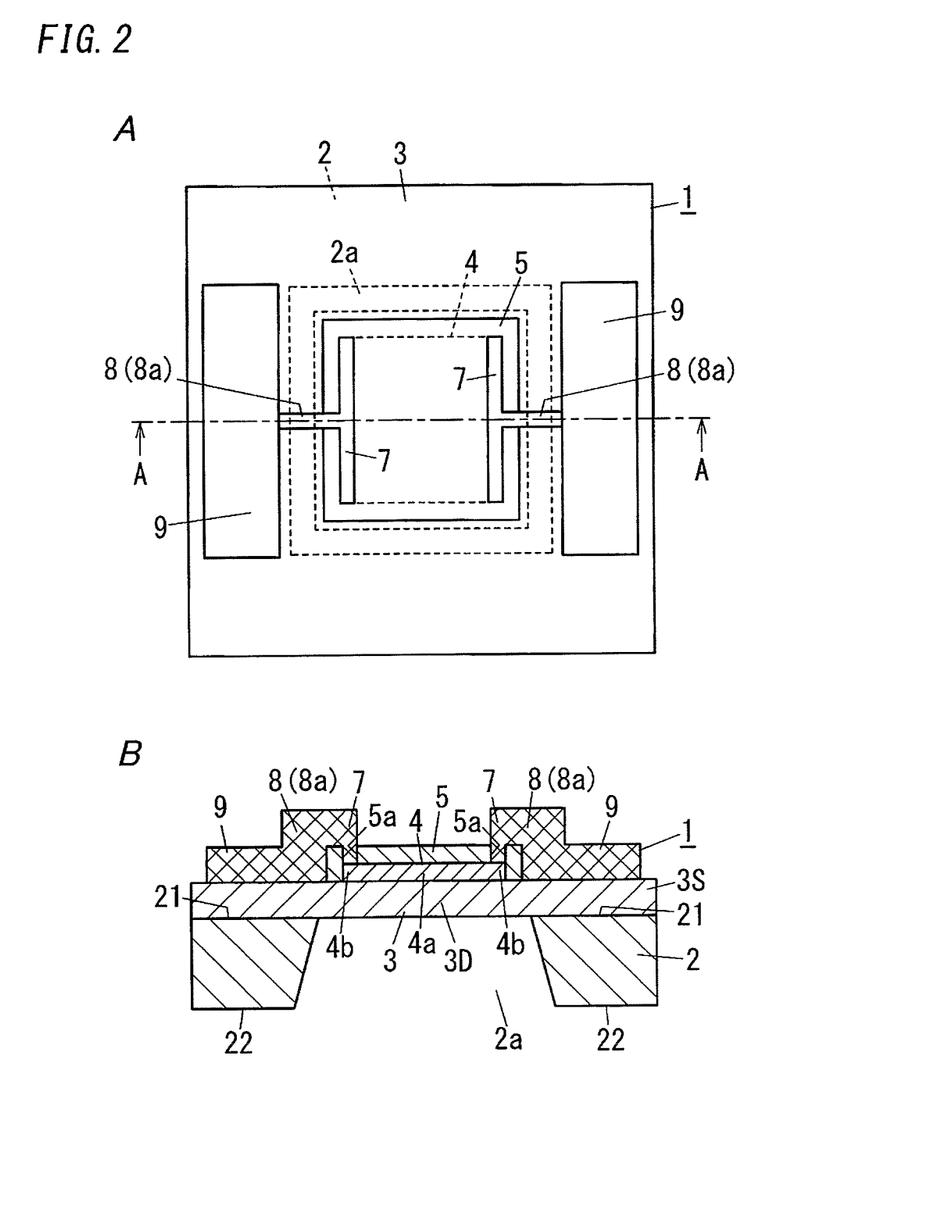
FIG. 2A is a schematic plan view of an infrared radiation element of the second embodiment.
FIG. 2B is a cross-section taken along A-A line of FIG. 2A.

An infrared radiation element 1 of the second embodiment will be described below based on FIGS. 2A and 2B.

The infrared radiation element 1 of the second embodiment includes the above-mentioned first to eighth, tenth, and eleventh features, as with the infrared radiation element 1 of the first embodiment. However, the infrared radiation element 1 of the second embodiment is different from the infrared radiation element 1 of the first embodiment in that the second insulating layer 5 is formed only in a projection region of the diaphragm part 3D of the first insulating layer 3 in the thickness direction (perpendicular direction to the sheet of FIG. 2A; vertical direction in FIG. 2B). In short, the infrared radiation element 1 of the second embodiment is different from the infrared radiation element 1 of the first embodiment in the region on which the second insulating layer 5 is formed. Specifically, in the infrared radiation element 1 of the second embodiment, the second insulating layer 5 is formed within the diaphragm region in which the opening 2a is formed at the surface 21 in a plan view. Note that constituent elements that are the same as in the first embodiment are assigned with the same numerals, and explanations thereof are omitted.

In the infrared radiation element 1 of the second embodiment, it is possible to reduce the heat capacity of the laminated unit (the first insulating layer 3, the heating element layer 4, and the second insulating layer 5) on the surface 21 of the substrate 2 than that of the infrared radiation element 1 of the first embodiment. Hence, it is possible to further lower energy consumption.

Third Embodiment

Figure 3:
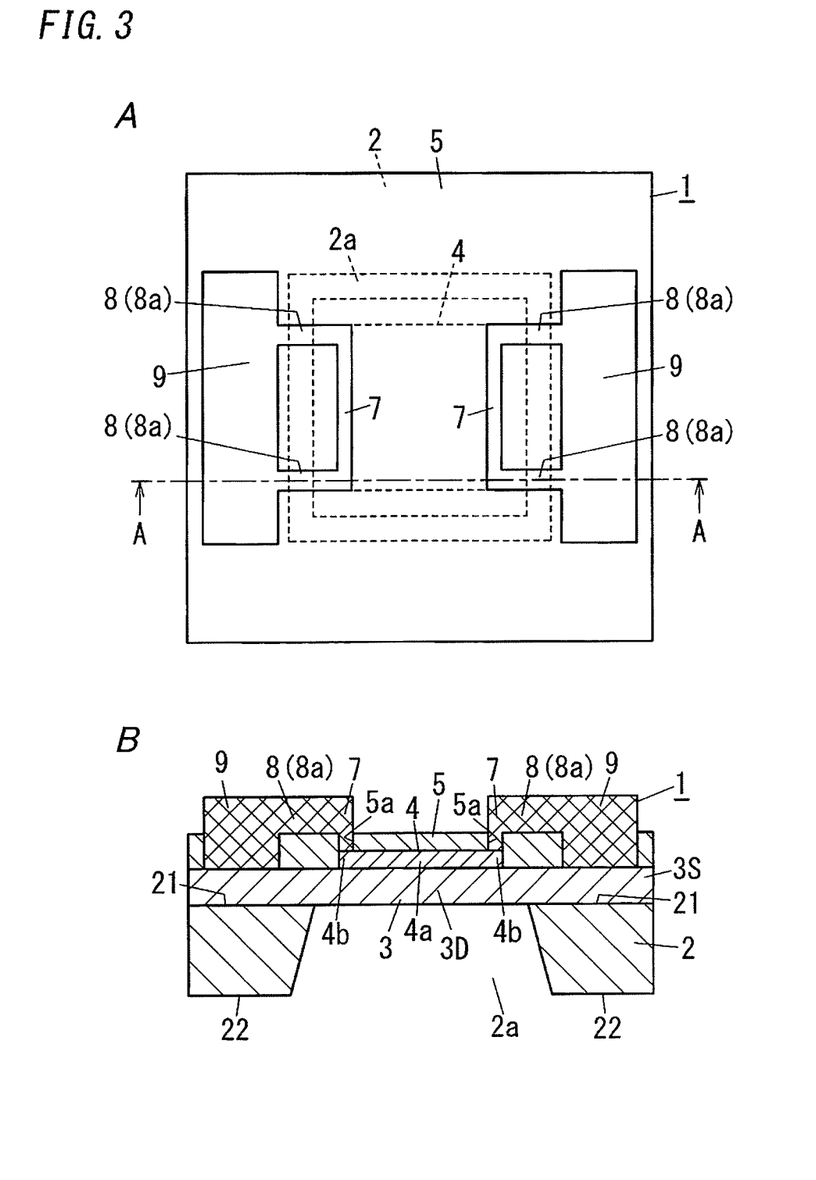
FIG. 3A is a schematic plan view of an infrared radiation element of the third embodiment.
FIG. 3B is a cross-section taken along A-A line of FIG. 3A.

An infrared radiation element 1 of the third embodiment will be described below based on FIGS. 3A and 3B.

The infrared radiation element 1 of the third embodiment includes the above-mentioned first to eighth, tenth, and eleventh features, as with the infrared radiation element 1 of the first embodiment. However, the infrared radiation element 1 of the third embodiment is different from the infrared radiation element 1 of the first embodiment in that one electrical connector 8 is composed of two or more wires 8a. In other words, the infrared radiation element 1 of the third embodiment includes the following ninth feature in addition to the first to eighth, tenth, and eleventh features. Specifically, the infrared radiation element 1 of the third embodiment is different from the infrared radiation element 1 of the first embodiment in that one electrical connector 8 connecting one electrode 7 to one pad 9 is composed of two wires 8a. Note that constituent elements that are the same as in the first embodiment are assigned with the same numerals, and explanations thereof are omitted.

The electrical connector 8 for connecting the electrode 7 to the pad 9 is composed of two wires 8a and 8a. Each wire 8a is connected to both ends of the heating element layer 4 in a perpendicular direction to a parallel direction of the pair of pads 9 and 9 in the plan view (seen along the perpendicular direction to the sheet of FIG. 3A; and seen along the vertical direction in FIG. 3B). That is, each wire 8a is in contact with one end of the electrode 7 and extends in the width direction (lateral direction in FIGS. 3A and 3B) of the infrared radiation element 1. Accordingly, in the infrared radiation element 1 of the third embodiment, it is more possible to uniform a current density of a current flowing through the heating element layer 4, compared with the infrared radiation element in which one wire 8a is connected to a center portion of the heating element layer 4 in the direction perpendicular to the parallel direction as with the infrared radiation element 1 of the first embodiment.

Regarding the infrared radiation element 1, there is concern that the diaphragm part 3D deforms due to expansion or contraction caused by heat generated in the heating element layer 4, and mechanical stress is applied on the electrical connector 8 (wire 8a) or the like. In this regard, the infrared radiation element 1 of the third embodiment has a two pair of wires 8a each connecting the electrode 7 to the pad 9. Therefore, even if one of the two wires 8a is disconnected, the infrared radiation element is available, and therefore it is possible to improve reliability and life. In the third embodiment, the electrical connector 8 is composed of the two wires 8a, however, the electrical connector 8 may be composed of three or more wires 8a.

As described above, the infrared radiation element 1 of the third embodiment includes the ninth feature in addition to the above-mentioned first to eighth, tenth, and eleventh features.

In the ninth feature, each of the pair of electrical connectors 8 is composed of two or more wires 8a. Note that in the infrared radiation element 1 of the third embodiment, the second, third, tenth, and eleventh features are optional.

Note that, in other embodiments, the two pairs of wires 8a each connecting the electrode 7 to the pad 9 may be provided.

Fourth Embodiment

Figure 4:
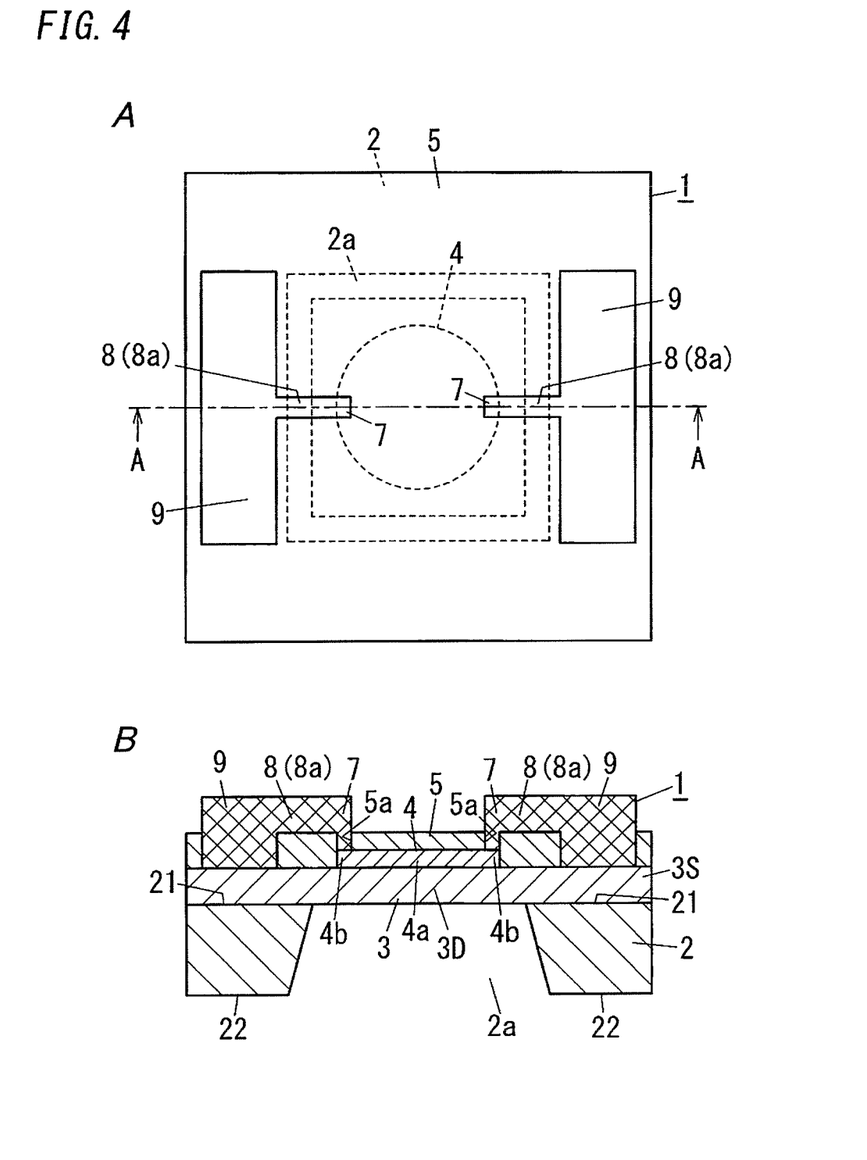
FIG. 4A is a schematic plan view of an infrared radiation element of the fourth embodiment.
FIG. 4B is a cross-section taken along A-A line of FIG. 4A.

An infrared radiation element 1 of the fourth embodiment will be described below based on FIGS. 4A and 4B.

The infrared radiation element 1 of the fourth embodiment includes the above-mentioned first to eighth, tenth, and eleventh features, as with the infrared radiation element 1 of the first embodiment. However, the infrared radiation element 1 of the fourth embodiment is different from the infrared radiation element 1 of the first embodiment in that a planar shape (the shape of the heating element layer 4 in a plane perpendicular to the thickness direction (perpendicular to the sheet of FIG. 4A; vertical direction in FIG. 4B) of the heating element layer 4) of the heating element layer 4 is a circle. Note that constituent elements that are the same as in the first embodiment are assigned with the same numerals, and explanations thereof are omitted.

In the infrared radiation element 1 of the fourth embodiment, it is possible to further suppress a variation in temperature of the heating element layer 4, compared with the infrared radiation element in which the heating element layer 4 has a planar shape of a rectangle as with the infrared radiation element 1 of the first embodiment. Therefore, it is possible to suppress a drop in infrared emissivity of the heating element layer 4 caused by heat loss. Hence, in the infrared radiation element 1 of the fourth embodiment, it is possible to lower energy consumption.

Note that, in the infrared radiation element 1 of the third embodiment, the planar shape of the heating element layer 4 may be a circle.

Fifth Embodiment

Figure 5:
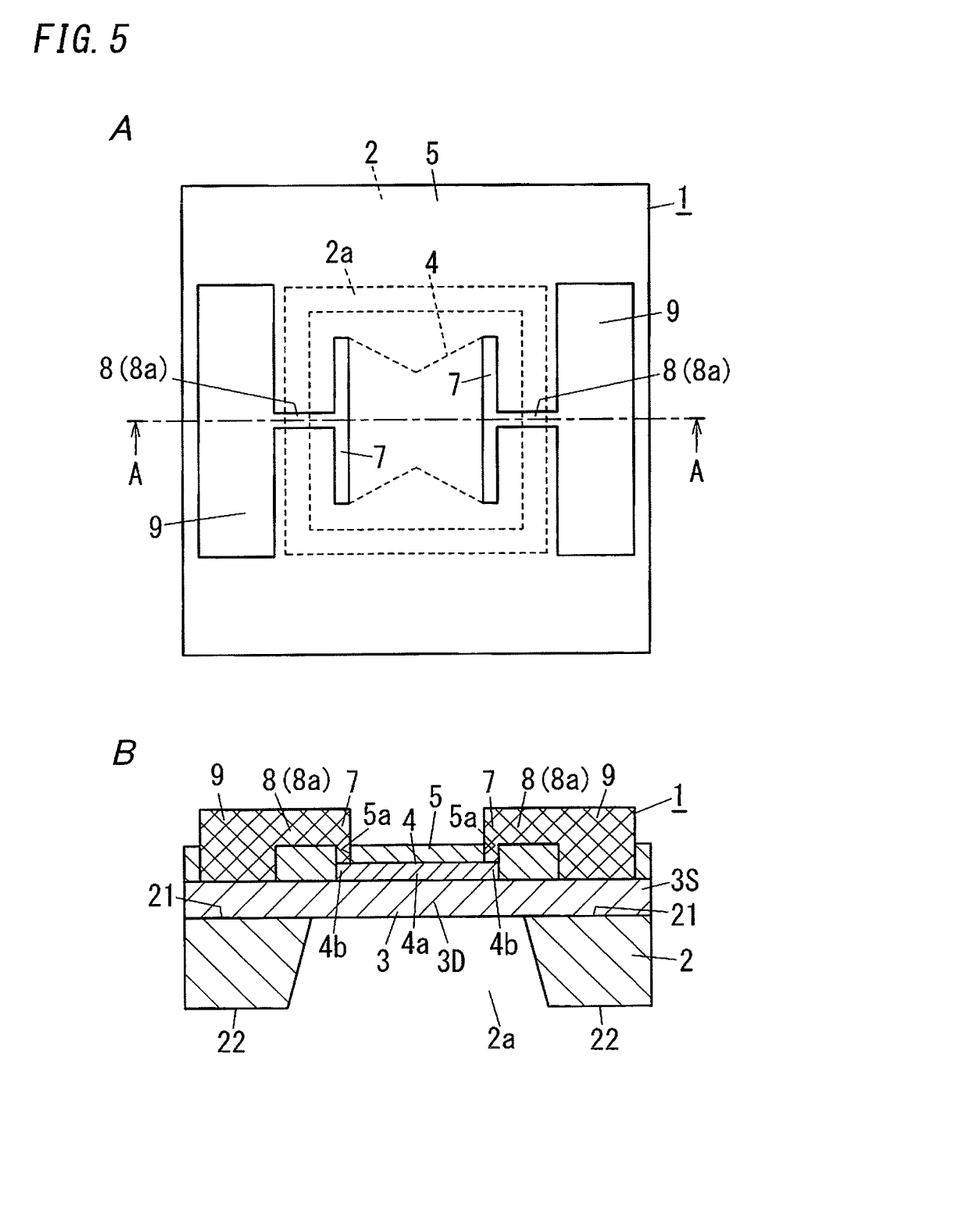
FIG. 5A is a schematic plan view of an infrared radiation element of the fifth embodiment.
FIG. 5B is a cross-section taken along A-A line of FIG. 5A.

An infrared radiation element 1 of the fifth embodiment will be described below based on FIGS. 5A and 5B.

The infrared radiation element 1 of the fifth embodiment includes the above-mentioned first to eighth, tenth, and eleventh features, as with the infrared radiation element 1 of the first embodiment. However, the infrared radiation element 1 of the fifth embodiment is different from the infrared radiation elements 1 of the first to fourth embodiments in a planar shape of the heating element layer 4 (the shape of the heating element layer 4 in a plane perpendicular to the thickness direction (perpendicular to the sheet of FIG. 5A; vertical direction in FIG. 5B) of the heating element layer 4). Note that constituent elements that are the same as in the first embodiment are assigned with the same numerals, and explanations thereof are omitted.

The planar shape of the heating element layer 4 of the infrared radiation element 1 of the fifth embodiment is such a shape that the width (length in the vertical direction in FIG. 5A) of the heating element layer 4 is gradually smaller than at the electrodes 7 in a perpendicular direction to the pair of electrodes 7 and 7.

In the infrared radiation element 1 of the fifth embodiment, it is possible to further suppress a variation in temperature of the heating element layer 4, compared with the infrared radiation element in which the heating element layer 4 has a planar shape of a rectangle, as with the infrared radiation element 1 of the first embodiment. Therefore, it is possible to suppress a drop in infrared emissivity of the heating element layer 4 caused by heat loss. Accordingly, in the infrared radiation element 1 of the fifth embodiment, it is possible to lower energy consumption.

Sixth Embodiment

An infrared radiation element 1 of the sixth embodiment will be described below based on FIGS. 6A and 6B.

The infrared radiation element 1 of the sixth embodiment includes the above-mentioned first to eighth, tenth, and eleventh features, as with the infrared radiation element 1 of the first embodiment. However, the infrared radiation element 1 of the sixth embodiment is different from the infrared radiation element 1 of the first embodiment in that a plurality (six, in FIG. 6A) of through holes 3H which communicate with the opening 2a of the substrate 2 are made in a region in which the diaphragm part 3D of the first insulating layer 3 overlaps with the second insulating layer 5. In other words, in the sixth embodiment, the through holes 3H are made in a region in which the heating element layer 4 is not formed in a plan view, out of the diaphragm region. Furthermore, in other words, the through holes 3H are formed in a region in which the heating element layer 4 is not formed but the first insulating layer 3 and the second insulating layer 5 are formed, out of the diaphragm region. In this regard, the through holes 3H do not penetrate the heating element layer 4 but penetrate the first insulating layer 3 and the second insulating layer 5 to the opening 2a. Note that constituent elements that are the same as in the first embodiment are assigned with the same numerals, and explanations thereof are omitted.

Figure 6:
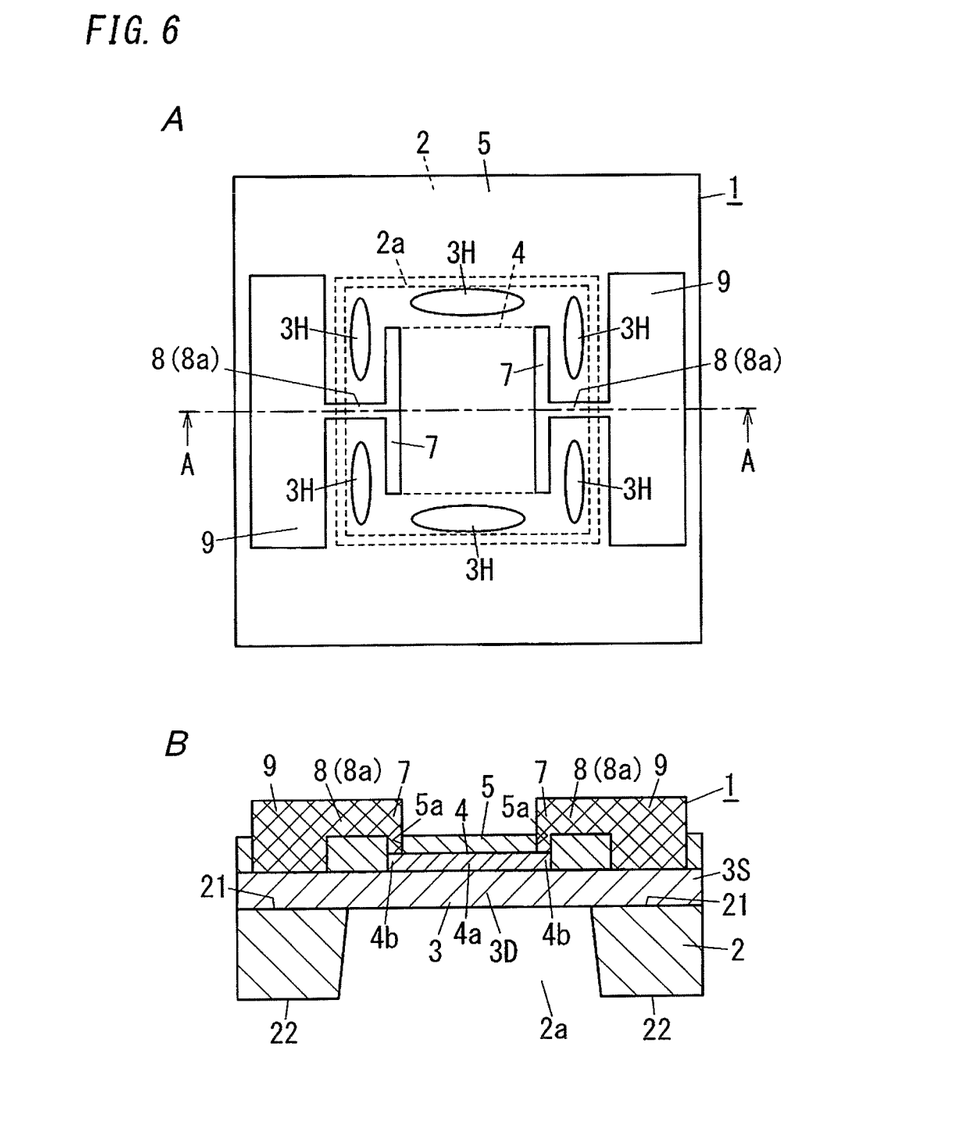
FIG. 6A is a schematic plan view of an infrared radiation element of the sixth embodiment.
FIG. 6B is a cross-section taken along A-A line of FIG. 6A.

The plurality of through holes 3H are preferably arranged so as to surround the heating element layer 4 in a plan view (seen along the perpendicular direction to the sheet of FIG. 6A; seen along the vertical direction in FIG. 6B), but are not limited to the example shown in FIG. 6A. The opening shape in the plan view of each through hole 3H is an ellipse, but is not limited thereto, and may be a circle, for example. Besides, in the example of FIG. 6A, each through hole 3H has an elliptical opening shape extending along any one of sides of the periphery of the heating element layer 4 which is rectangular in a plan view, but is not limited to having the above shape, and may have an L-shaped opening shape extending along two sides or an U-shaped opening shape extending along three sides.

The plurality of through holes 3H are preferably arranged symmetrical about the center line of the infrared radiation element 1 perpendicular to the direction in which the pair of electrodes 7 and 7 are arranged in a plan view.

In the infrared radiation element 1 of the sixth embodiment, the above-mentioned plurality of through holes 3H are made, and therefore it is possible to reduce thermal conductance between the heating element layer 4 and the substrate 2. Hence, it is possible to further lower energy consumption.

Note that in the infrared radiation element 1 of the sixth embodiment, the planar shape (the shape of the heating element layer 4 in a plane perpendicular to the thickness direction (perpendicular direction to the sheet of FIG. 6A; vertical direction in FIG. 6B) of the heating element layer 4) of the heating element layer 4 may be the same as that of the fourth embodiment or the fifth embodiment.

Seventh Embodiment

Figure 7:
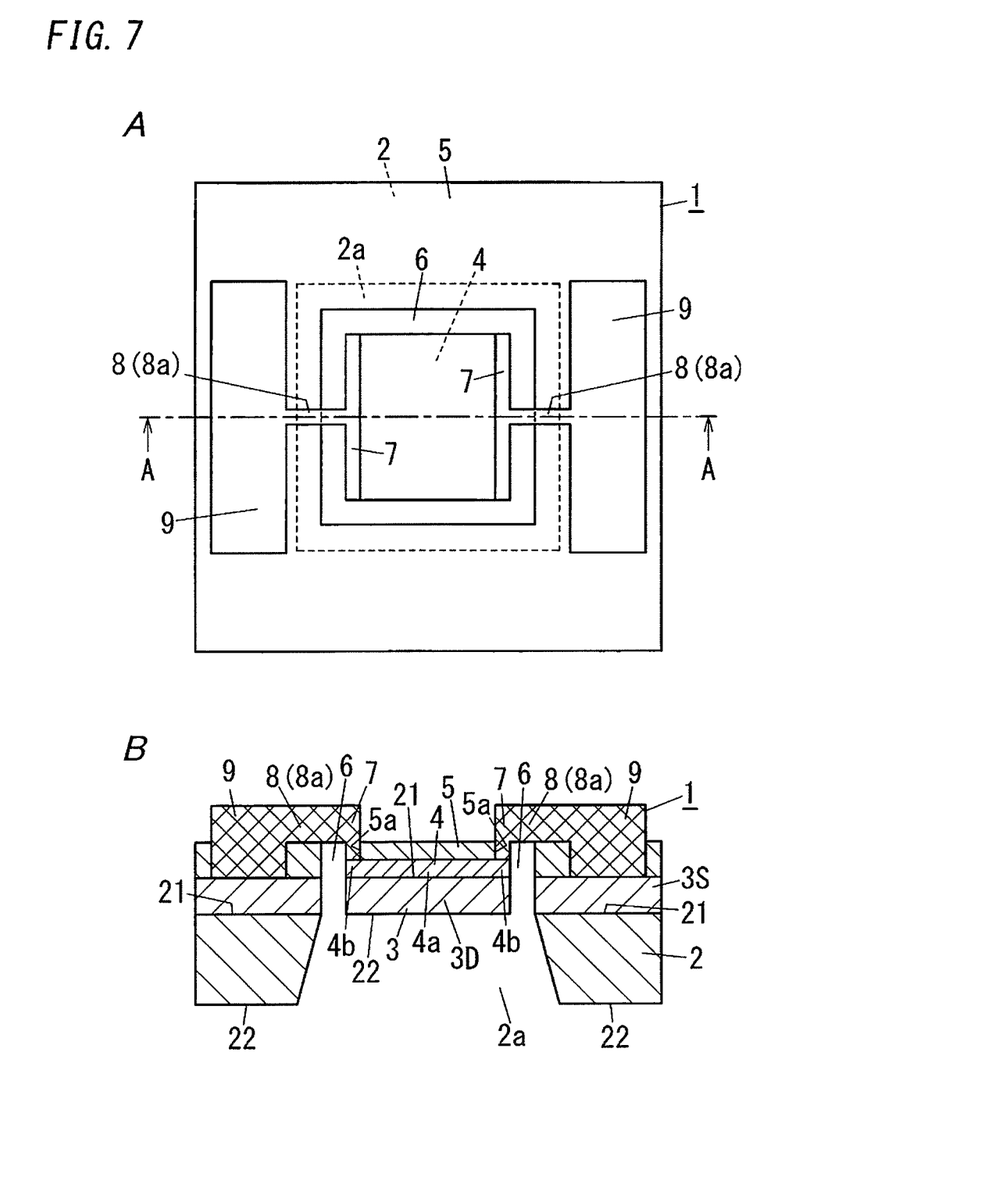
FIG. 7A is a schematic plan view of an infrared radiation element of the seventh embodiment.
FIG. 7B is a cross-section taken along A-A line of FIG. 7A.

An infrared radiation element 1 of the seventh embodiment will be described below based on FIGS. 7A and 7B.

The infrared radiation element 1 of the seventh embodiment includes the above-mentioned first to eighth, tenth, and eleventh features, as with the infrared radiation element 1 of the first embodiment. However, the infrared radiation element 1 of the seventh embodiment is different from the infrared radiation element 1 of the first embodiment in that the laminated unit of the first insulating layer 3, the heating element layer 4, and the second insulating layer 5 over the opening 2a of the substrate 2 is supported by the supporting part 3S through the wires 8a and 8a. Note that constituent elements that are the same as in the first embodiment are assigned with the same numerals, and explanations thereof are omitted.

The infrared radiation element 1 of the seventh embodiment has a slit 6 surrounding the above-mentioned laminated unit at an entire periphery thereof in a laminate of the first insulating layer 3 and the second insulating layer 5, and this slit 6 communicates with the opening 2a.

In the infrared radiation element 1 of the seventh embodiment, it is possible to reduce thermal conductance between the heating element layer 4 and the substrate 2, compared with that of the first embodiment. Hence, it is possible to further lower energy consumption.

Note that in the infrared radiation element 1 of the seventh embodiment, the planar shape (the shape of the heating element layer 4 in a plane perpendicular to the thickness direction (perpendicular direction to the sheet of FIG. 7A; vertical direction in FIG. 7B) of the heating element layer 4) of the heating element layer 4 may be the same as that of the fourth embodiment or the fifth embodiment.

Use of the infrared radiation elements 1 of the embodiments is not limited to an infrared source for a gas sensor, and may be an infrared light source for an infrared light communication or for spectroscopic analysis.

The invention claimed is:

1. An infrared radiation element comprising:
   a first insulating layer having heat insulating properties and electrically insulating properties;
   a heating element layer provided on the first insulating layer and configured to radiate infrared radiation when energized; and
   a second insulating layer provided on an opposite side of the heating element layer from the first insulating layer and having heat insulating properties and electrically insulating properties,
   the second insulating layer transmitting the infrared radiation radiated from the heating element layer, and
   the heating element layer having such a sheet resistance that impedance of the heating element layer matches impedance of space which is in contact with the second insulating layer.

2. The infrared radiation element as set forth in claim 1, wherein
   the sheet resistance of the heating element layer is selected so that an infrared emissivity of the heating element layer is not less than a predetermined value.

3. The infrared radiation element as set forth in claim 2, wherein
   the sheet resistance of the heating element layer falls within a range of 73Ω/☐ to 493Ω/☐.

4. The infrared radiation element as set forth in claim 1, further comprising a substrate,
   the first insulating layer being provided on a surface of the substrate.

5. The infrared radiation element as set forth in claim 4, wherein
   the substrate has an opening to expose the first insulating layer.

6. The infrared radiation element as set forth in claim 5, wherein
   the heating element layer is positioned in a region in which the first insulating layer is in contact with the opening in a plan view.

7. The infrared radiation element as set forth in claim 5, further comprising
   a pair of electrodes provided respectively on both ends of an opposite surface of the heating element layer from the first insulating layer.

8. The infrared radiation element as set forth in claim 7, further comprising:
   a pair of pads positioned in a region in which the opening is not provided in a plan view; and
   a pair of electrical connectors electrically connecting the pair of pads to the pair of electrodes, individually,
   the pair of pads being arranged to extend parallel to a predetermined direction, and
   the pair of electrical connectors being arranged symmetrical about a center line passing through a center of gravity of the heating element layer and extending in the predetermined direction.

9. The infrared radiation element as set forth in claim 8, wherein
   each of the pair of electrical connectors is composed of two or more wires.

10. The infrared radiation element as set forth in claim 8, wherein
    the pair of electrical connectors are made of tantalum.

11. The infrared radiation element as set forth in claim 1, wherein
    the heating element layer is made of tantalum nitride or electrically conductive polysilicon.

* * * * *